United States Patent [19]

Kaewell, Jr. et al.

[11] Patent Number: 5,402,451
[45] Date of Patent: Mar. 28, 1995

[54] DIGITAL POST-DETECTION FM SPATIAL DIVERSITY COMBINATION CIRCUIT

[75] Inventors: John D. Kaewell, Jr., Bensalem; David M. Cooley, Upper Darby, both of Pa.; Youngky Kim, N. Potomac, Md.

[73] Assignee: Hughes Aircraft Company, Los Angeles, Calif.

[21] Appl. No.: 3,901

[22] Filed: Jan. 11, 1993

[51] Int. Cl.$^6$ .............................................. H04L 1/02
[52] U.S. Cl. ................................. 375/347; 455/134; 455/135; 455/137
[58] Field of Search ................... 375/100, 40; 455/134, 455/135, 137

[56] References Cited

U.S. PATENT DOCUMENTS 5,031,193  7/1991  Atkinson et al. ..................... 375/13

Primary Examiner—Stephen Chin
Assistant Examiner—Tesfaldet Bocure
Attorney, Agent, or Firm—Gordon R. Lindeen, III; Wanda K. Denson-Low

[57] ABSTRACT

A Digital Post-Detection (Post-Discriminator) FM spatial diversity combination circuit improves performance for fading channels typical of cellular radio operating environments. A feature of this system is its flexibility. The system can be configured to use signal quality information in a manner which is appropriate for a given radio environment. Also, the weighting information can be derived from various sources and then processed to accommodate various situations. This spatial combiner has the ability to perform as a "hybrid" combiner. For example, this circuit can combine signals from various receivers based on soft weighting information, as in a maximal ratio combiner, or on hard weighting information, as in a switching combiner. The basic circuit includes a normalizing circuit (21, 22, 23) which receives the digitized received signal strength indicator samples from each of first and second receivers (11, 12) and generates first and second weighting signals. A first multiplier (24) multiplies the digitized discriminator samples from the first receiver by the first weighting signal to generate a first weighted output signal. A second multiplier (25) multiplies the digitized discriminator samples from the second receiver by the second weighting signal to generate a second weighted output signal. The first and second weighted output signals are combined in a post-detection, maximal ratio combining circuit (26).

10 Claims, 6 Drawing Sheets

DIGITAL POST-DETECTION FM SPATIAL DIVERSITY COMBINATION CIRCUIT

BACKGROUND OF THE INVENTION

1. Field of the Invention

The present invention generally relates to spatial diversity radio receiving systems and, more particularly, to a Digital Post-Detection FM spatial diversity combination circuit for fading channels typical of cellular radio operating environments.

2. Description of the Prior Art

Antenna diversity, also known as spatial diversity, is a useful technique for combating Rayleigh fading. The instantaneous fading characteristics seen by two or more receivers operating off of physically separated receive antennas will be different. If the antennas are separated by an appropriate distance, the fading characteristics which will be seen by the two receivers will be largely uncorrelated. This means that it is highly likely that the signal quality of one of the receivers will be better than the signal quality of the other receiver at any given time. By adaptively using the output from the receiver with the better signal quality, the overall output signal to noise ratio (SNR) can be improved.

The key to effectively implementing diversity combining is determining which receiver has the better signal quality. In the past, fixed analog combining techniques were used. These analog combining methods would be optimized for certain operating environments such as either a thermal noise limited environment or a carrier to interference limited environment. A problem with the analog approach is that the analog cellular channel is very dynamic and its properties can change from one type of environment to another. This digital FM spatial combining technique can adapt to accommodate the environment. Analog based diversity combining systems are typically designed as either a maximal ratio combiner, equal gain combiner or a switching combiner.

SUMMARY OF THE INVENTION

It is therefore an object of the present invention to provide a digital combiner that can operate in a "hybrid" mode which can combine the best features of the individual analog combining methods.

By use of digital signal processing, highly effective combination decisions can be made which would be very difficult or nearly impossible with traditional analog signal processing. Also, with digital signal processing the best set of diversity combining "weights" can be determined for a particular operating environment. In the past, diversity combination was implemented with analog circuitry. The diversity gain which was achievable in a laboratory was very difficult to achieve in production. Consistency between laboratory-prototype equipment performance and production equipment is easily attained with digital signal processing circuitry.

A feature of this system is its flexibility. The system can be configured to use signal quality information in a manner which is appropriate for a given radio environment. Also, the weighting information can be derived from various sources and then processed to accommodate various situations. This spatial combiner has the ability to perform as a "hybrid" combiner. For example this circuit can combine signals from various receivers based on soft weighting information, as in a maximal ratio combiner, or on hard weighting information, as in a switching combiner.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
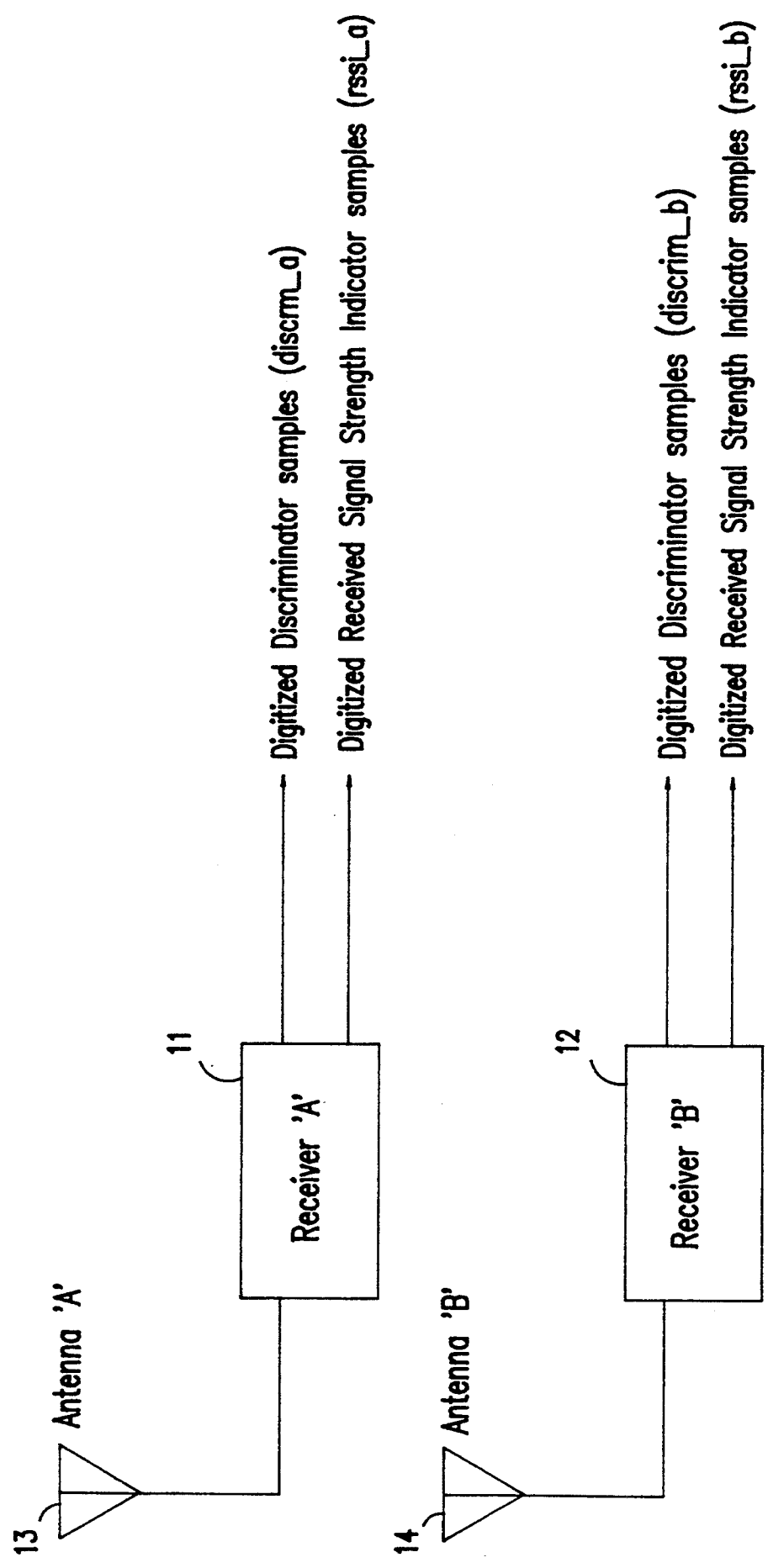
FIG. 1 is block diagram of two receivers and their outputs which are used by the digital FM spatial diversity combiner according to the invention.

Referring now to the drawings, and more particularly to FIG. 1, there is shown a block diagram of the receivers 11 and 12 connected to respective antennas 13 and 14. The antennas 13 and 14 are spaced a distance which is determined by the frequency of the channel. For example, at 6 GHz, the spacing is about nine feet. The receivers 11 and 12 each provide as outputs digitized discriminator samples and digitized Received Signal Strength Indicator (RSSI) samples which are used by the digital FM spatial diversity combiner according to the invention. The receivers include the analog-to-digital (A/D) conversion circuitry necessary to deliver the digitized RSSI samples and the digitized discriminator samples to the Digital Signal Processor (DSP) which implements the spatial combination.

Figure 2:
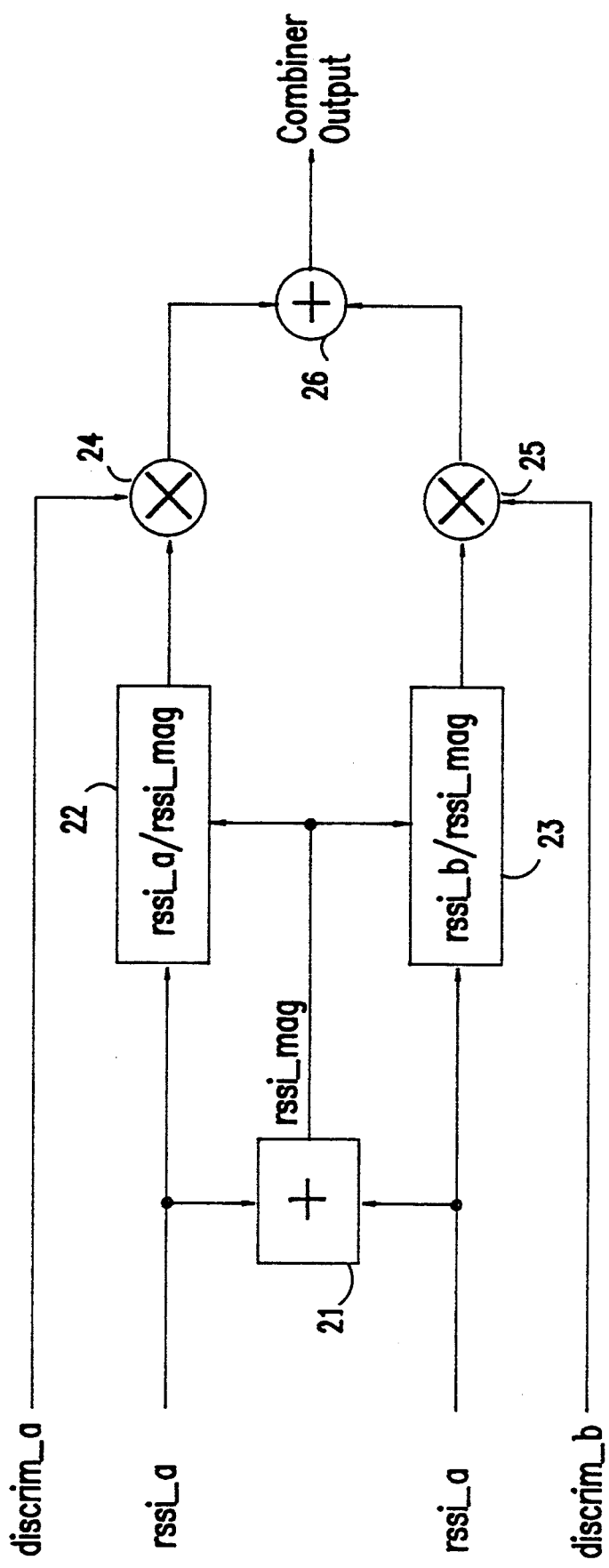
FIG. 2 is a block diagram of the basic digital FM post-detection spatial combiner according to the invention.

The basic digital FM post-detection spatial combiner is shown in FIG. 2. In this system the unsigned logarithmic RSSI samples are normalized. This accomplished by averaging the RSSI samples from receivers 11 and 12 in averager circuit 21 and then using this average as the divisor in dividers 22 and 23 which respectively receive the RSSI samples from receivers 11 and 12 as their dividend inputs. The normalized RSSI samples are applied to respective multipliers 24 and 25 to weight the respective discriminator samples from receivers 11 and 12 before the discriminator samples are combined in summer 26. This type of combination is known as a post-detection, maximal ratio combiner. The normalization of the RSSI information is a feature which would be difficult to attain in an analog system. The normalization of the RSSI information before combining keeps the combined output at a desirable amplitude.

Figure 3:
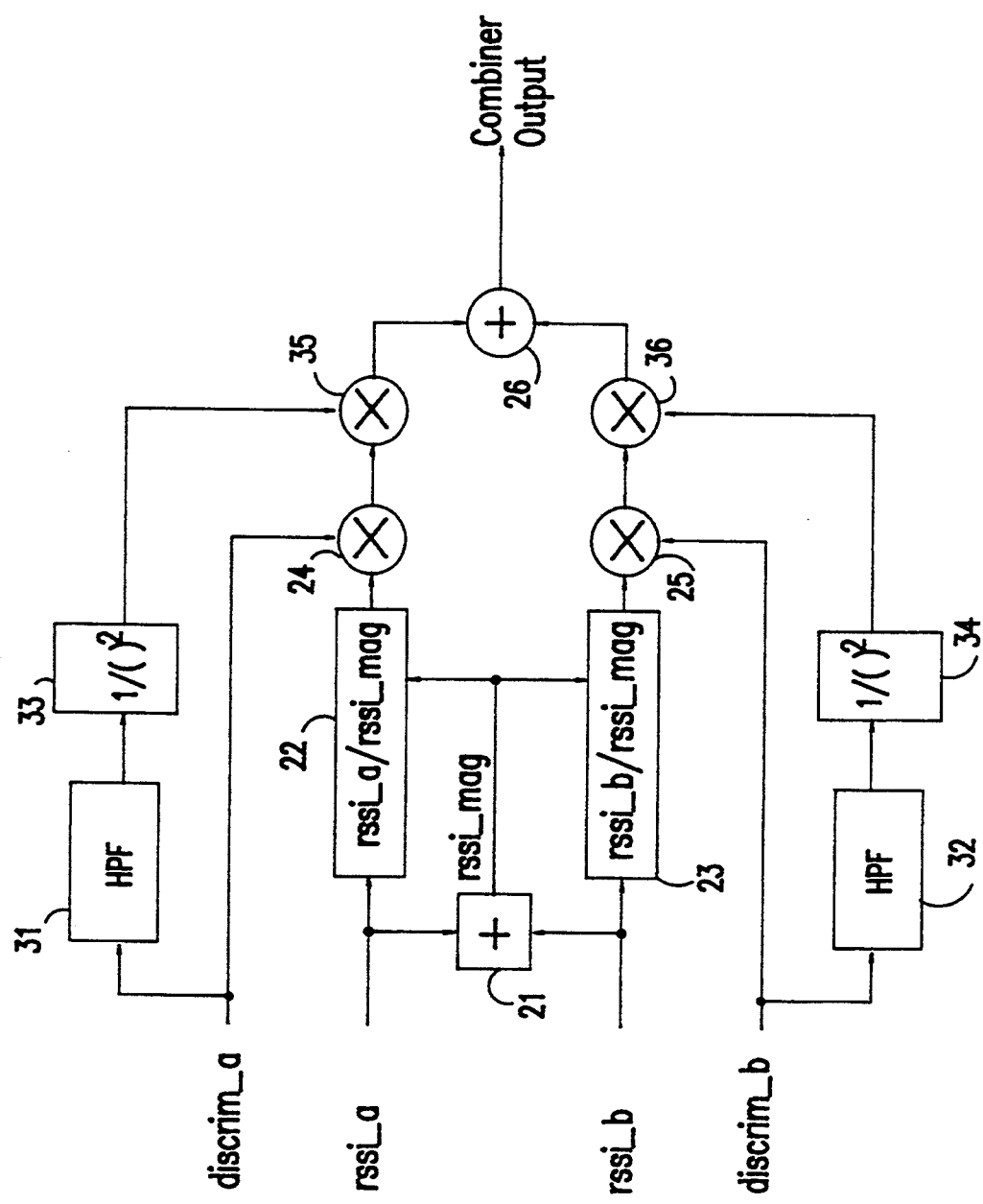
FIG. 3 is a block diagram of a first modification of the basic digital FM post-detection spatial combiner shown in FIG. 2.

A first modification of the basic digital post-detection spatial combiner is shown in FIG. 3. In this modification, the actual discriminator samples are analyzed to try and determine if the SNR of the signal into the discriminator has gone below the quieting threshold of the FM discriminator. When the input SNR to the discriminator drops below the quieting threshold, there is a large decrease in the discriminator's output SNR. This condition is detectable by monitoring the "click" energy or high frequency energy which greatly increases when the input SNR drops below the quieting threshold. To detect the "click" energy, the discriminator samples from receivers 11 and 12 are high pass filtered in respective filters 31 and 32. The high pass filter cutoff frequency is chosen to be above the voice and signalling tone frequencies. There are various options on how to use the high pass filter output. The high pass filter output can be further processed to provide a "soft" weighting to the discriminator samples before they are combined as shown in FIG. 3. The high pass filter outputs are squared and inverted in inverse squarers 33 and 34 to give a power representation of the high frequency energy present in the received signal. The inverse of the power calculation is then used to weight the respective discriminator samples in multipliers 35 and 36.

Figure 4:
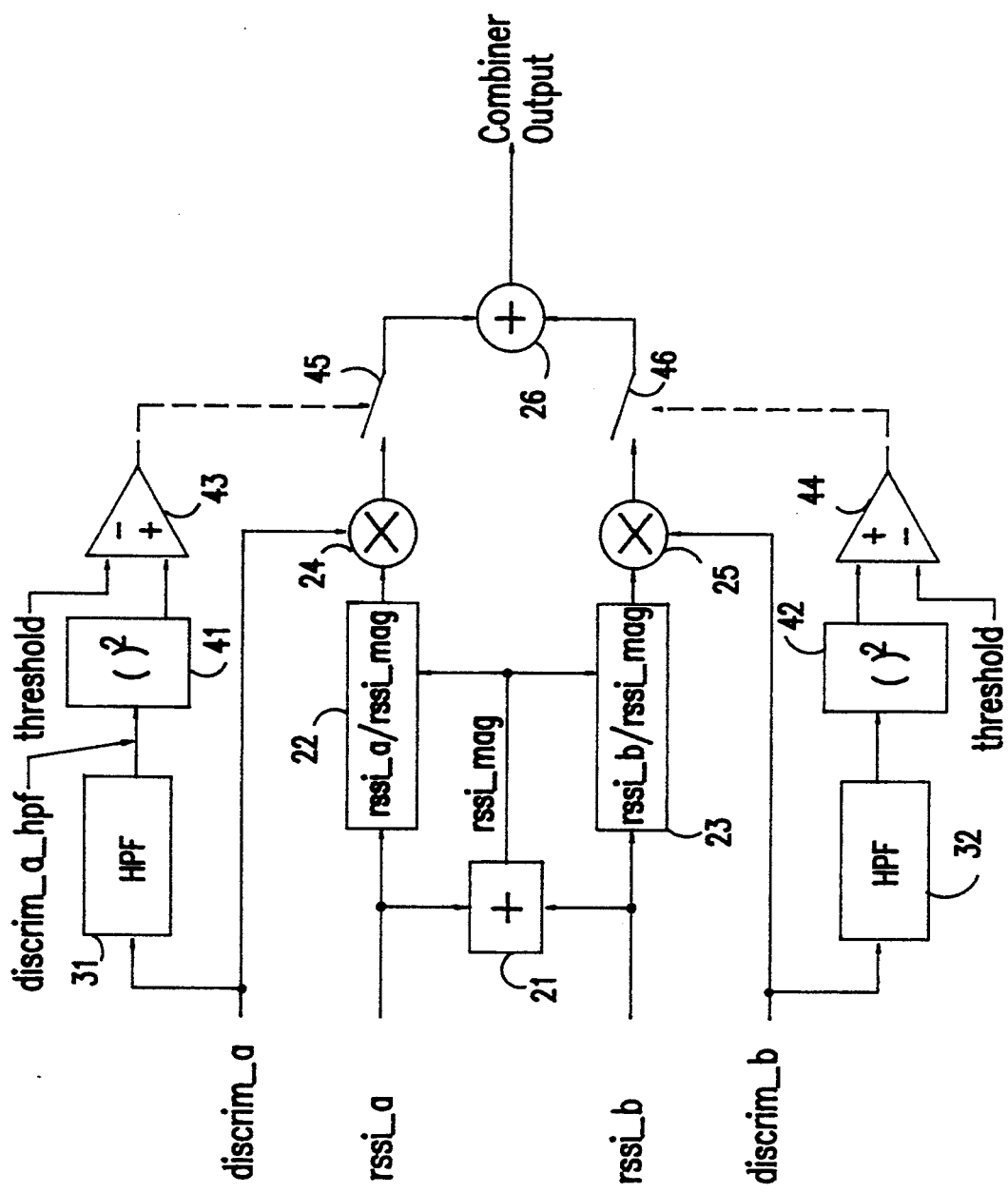
FIG. 4 is a block diagram of a second modification of the basic digital FM post-detection spatial combiner shown in FIG. 2.

A second modification is to make a threshold decision on the energy level out of the high pass filter. This spatial combiner configuration is shown in FIG. 4. The outputs of the high pass filters 31 and 32 are squared in respective squarers 41 and 42, and the squared outputs are compared in comparators 43 and 44 with a threshold. The comparators control respective switches 45 and 46. If the energy level was high, the respective discriminator samples are not allowed to pass to the summer 26. If the energy level was low the discriminator samples are allowed to pass to the summer 26.

Figure 5:
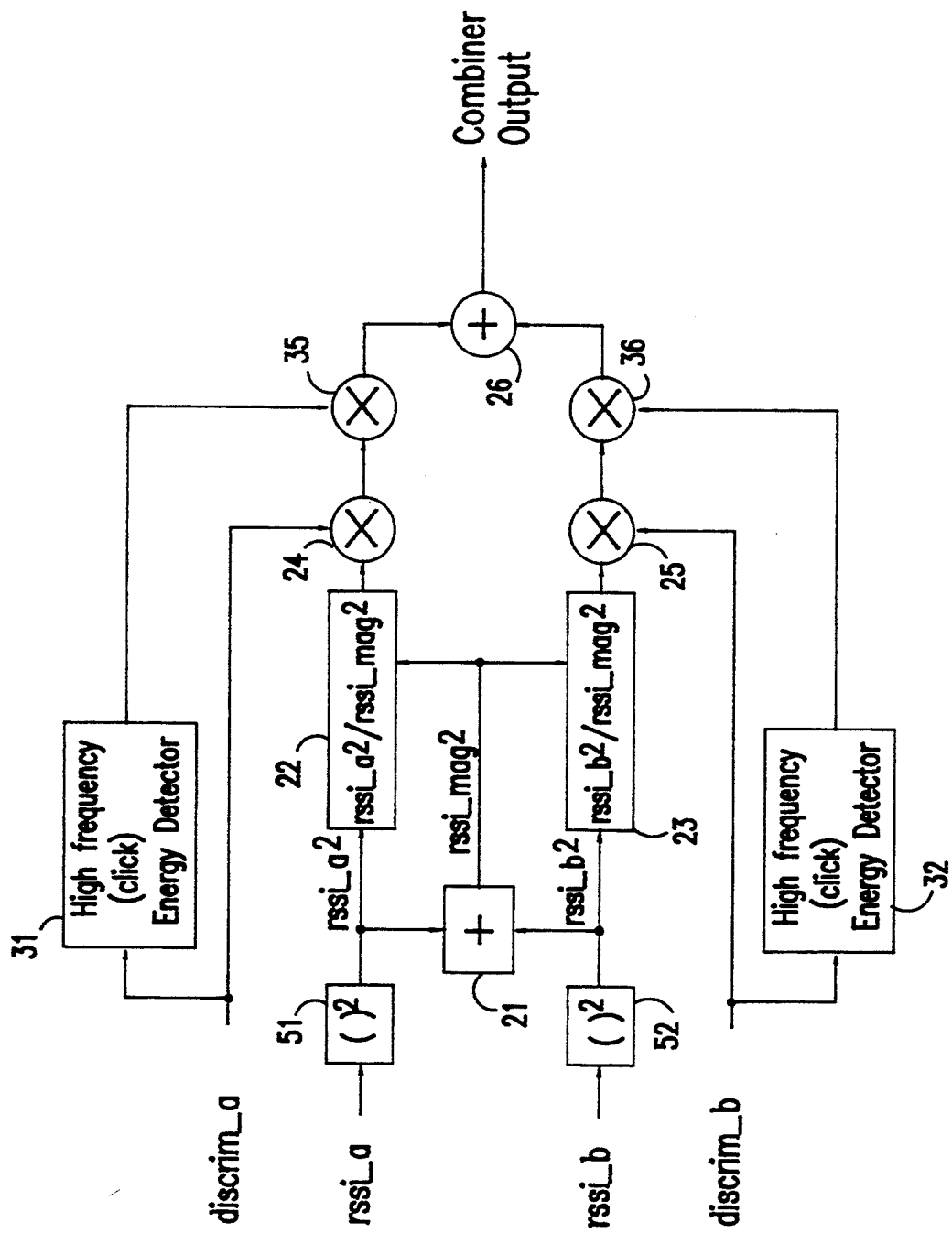
FIG. 5 is a block diagram of a third modification of the basic digital FM post-detection spatial combiner shown in FIG. 2.

When the situation exists that one receiver's output is better than the other receiver's output, it is desirable to weight more heavily the good receiver's output. A simple means to achieve this is to square the RSSI samples from the receivers as shown in FIG. 5. More specifically, the RSSI samples from receivers 11 and 12 are squared in respective squarers 51 and 52, and the squared outputs are normalized. The squared RSSI samples are used to weight the respective discriminator samples. This exponentiation process can be carried to higher orders to increase the distance between the good channel's weighting versus the bad channel's weighting. As higher orders of exponentiation are used the closer the combiner's performance comes to that of a switching combiner.

Figure 6:
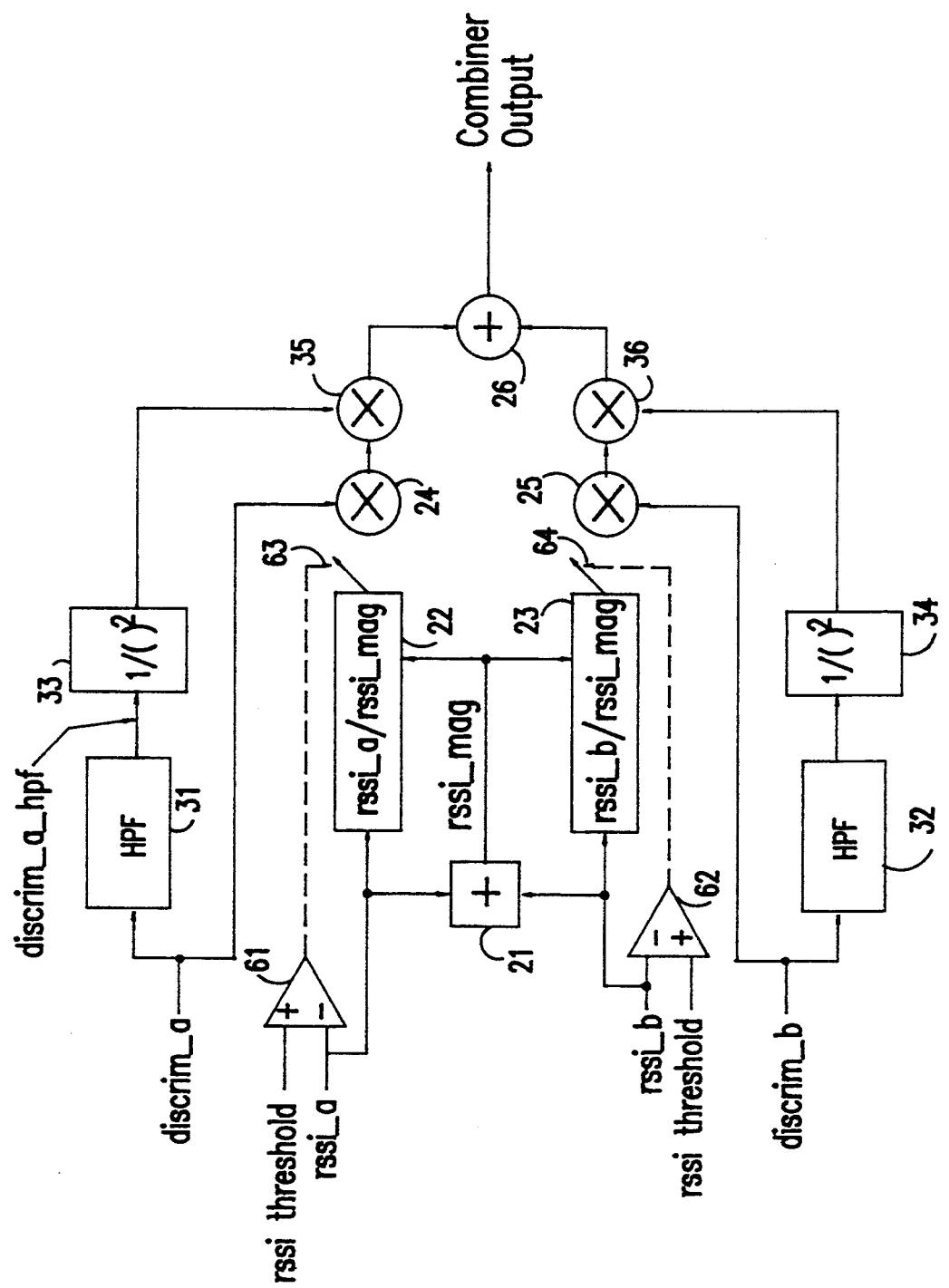
FIG. 6 is a block diagram of a fourth modification of the basic digital FM post-detection spatial combiner shown in FIG. 2.

FIG. 6 shows a modification useful in a thermal noise limited environment. The RSSI samples from receivers 11 and 12 are supplied to respective comparators 61 and 62 which control switches 63 and 64. The RSSI threshold can be set based on the known operating characteristics of the receivers. If the received signal level is at a level below the RSSI threshold, the discriminator samples from that receiver would not be used. The threshold would be set at a level slightly above the quieting threshold of the discriminator. When the signal level is above the RSSI threshold, the normal RSSI weighted discriminator combination would be performed.

In a Carrier to Interference (C/I) environment typical of an urban cellular system, the RSSI readings can be high despite a poor C/I. In this situation, the spatial diversity system can make a better decision base the "click" energy which greatly increases in poor C/Is. For this situation, the diversity systems shown in FIGS. 3 and 5 are more appropriate. Since the RSSI readings are not very useful, they would be switched out of the system, and the diversity decisions will rely solely on the high pass filter output energies.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A digital post-detection FM spatial diversity combination circuit receiving digitized discriminator samples and digitized received signal strength indicator samples from first and second receivers comprising:

a normalizer receiving said digitized received signal strength indicator samples from each of said first and second receivers and generating first and second weighting signals from said first and second received signal strength indicator samples respectively;

a first multiplier for multiplying the digitized discriminator samples from said first receiver by said first weighting signal to generate a first weighted output signal;

a second multiplier for multiplying the digitized discriminator samples from said second receiver by said second weighting signal to generate a second weighted output signal;

a first high frequency energy detector receiving said digitized discriminator samples from said first receiver and generating a first signal quality measure therefrom;

a second high frequency energy detector receiving said digitized discriminator samples from said second receiver and generating a second signal quality measure therefrom;

a first regulator for modulating said first weighted output signal in response to said first signal quality measure;

a second regulator for modulating said second weighted output signal in response to said second signal quality measure; and a combiner for combining said first and second modulated weighted output signals.

2. The digital post-detection FM spatial diversity combination circuit recited in claim 1 wherein said first and second high frequency energy detectors comprise:

first and second high pass filters respectively receiving the digitized discriminator samples from said first and second receivers; and first and second inverse squarers connected to respective outputs of said first and second high pass filters to generate said first and second signal quality measures based on an inverse power calculation; and wherein said first and second regulators comprise third and fourth multipliers for respectively multiplying said first and second modulated weighted output signals by said first and second quality measures prior to combining those signals by said combiner.

3. The digital post-detection FM spatial diversity combination circuit recited in claim 1 wherein said first and second high frequency energy detectors comprise:

first and second high pass filters respectively receiving the digitized discriminator samples from said first and second receivers; and first and second squarers connected to respective outputs of said first and second high pass filters to generate said first and second signal quality measures based on a power calculation; and wherein said first and second regulators comprise:

first and second comparators for respectively comparing said first and second signal quality measures with a threshold; and first and second switches respectively controlled by said first and second comparators for passing the digitized discriminator samples from a corresponding one of said first and second multipliers if the energy level of said first or second signal quality measures is low but blocking the digitized discriminator samples from a corresponding one of said first and second multiplier means if the energy level of said first or second power signals is high.

4. The digital post-detection FM spatial diversity combination circuit recited in claim 1 further comprising:

first and second squarers for squaring the digitized received signal strength indicator samples from each of said first and second receivers to generate first and second squared signals, said first and second squared signals being supplied to said normalizer;

first and second high pass filters respectively receiving the digitized discriminator samples from said first and second receivers; and third and fourth multipliers for respectively multiplying said first and second modulated weighted output signals by outputs of said first and second high pass filters prior to combining those signals by said combiner.

5. The digital post-detection FM spatial diversity combination circuit recited in claim 1 wherein said first and second high frequency energy detectors comprise:

first and second high pass filters respectively receiving the digitized discriminator samples from said first and second receivers;

first and second inverse squarers connected to respective outputs of said first and second high pass filters to generate said first and second signal quality measures based on an inverse power calculation; and third and fourth multipliers for respectively multiplying said first and second modulated weighted output signals by said first and second signal quality measures prior to combining those signals by said combiner and wherein said circuit further comprises first and second comparators for respectively comparing the digitized received signal strength indicator samples from each of said first and second receivers with a threshold; and first and second switches respectively controlled by said first and second comparators for passing the digitized discriminator samples to a corresponding one of said first and second multipliers if the digitized received signal strength indicator samples are above said threshold.

6. A digital post-detection FM spatial diversity combination method comprising the steps of:

digitizing discriminator samples and received signal strength indicator samples from first and second receivers;

normalizing the digitized received signal strength indicator samples from each of said first and second receivers and generating first and second weighting signals from said first and second received signal strength indicator samples, respectively;

multiplying the digitized discriminator samples from said first receiver by said first weighting signal to generate a first weighted output signal therefrom;

multiplying the digitized discriminator samples from said second receiver by said second weighting signal to generate a second weighted output signal therefrom;

generating a first signal quality measure from said digitized discriminator samples of said first receiver;

generating a second signal quality measure from said digitized discriminator samples of said second receiver;

modulating said first weighted output signal in response to said first signal quality measure;

modulating said second weighted output signal in response to said second quality measure; and combining said first and second modulated weighed output signals.

7. The digital post-detection FM spatial diversity combination method recited in claim 6 wherein the steps of generating first and second signal quality measures comprise:

high pass filtering the digitized discriminator samples from said first and second receivers using respective first and second high pass filters; and squaring high pass outputs of said first and second high pass filters to generate said first and second signal quality measures based on an inverse power calculation; and wherein the steps of modulating said first and second weighted output signals comprise respectively multiplying said first and second weighed output signals by said first and second signal quality measures prior to combining those signals.

8. The digital post-detection FM spatial diversity combination method recited in claim 6 wherein the steps of modulating said first and second weighed output signals comprise:

high pass filtering the digitized discriminator samples from said first and second receivers using respective first and second high pass filters; and squaring respective outputs of said first and second high pass filters to generate first and second signal quality measures based on a power calculation; and wherein said steps of modulating said first and second weighted output signals comprise:

comparing said first and second signal quality measures with a threshold; and passing a corresponding one of said first and second modulated weighted output signals if the energy level of said first or second signal quality measure is low but blocking the corresponding one of said first and second modulated weighted output signals if the energy level of said first or second signal quality measure is high.

9. The digital post-detection FM spatial diversity combination method recited in claim 6 further comprising the steps of:

squaring the digitized received signal strength indicator samples from each of said first and second receivers to generate first and second squared signals, said first and second squared signals being used to perform said normalizing step; and wherein the steps of generating first and second signal quality measures comprise high pass filtering the digitized discriminator samples from said first and second receivers using first and second high pass filters; and wherein the steps of modulating said weighted output signals comprise respectively multiplying said first and second weighted output signals by outputs of said first and second high pass filters prior to the step of combining.

10. The digital post-detection FM spatial diversity combination method recited in claim 6 wherein the steps of generating first and second weighted output signals comprise the steps of:

high pass filtering the digitized discriminator samples from said first and second receivers using first and second high pass filters; and squaring the respective outputs of said first and second high pass filters to generate said first and second signal quality measures based on an inverse power calculation; and wherein the step of modulating said first and second weighted output signals comprises respectively multiplying said first and second weighted output signals by said first and second signal quality measures prior to combining those signals; and wherein the method further comprises the steps of respectively comparing the digitized received signal strength indicator samples from each of said first and second receivers with a threshold; and passing corresponding digitized discriminator samples if the digitized received signal strength indicator samples are above said threshold.

* * * * *